United States Patent
Kanno

(10) Patent No.: US 7,139,013 B2
(45) Date of Patent: Nov. 21, 2006

(54) LASER SCANNING CONTROL APPARATUS

(75) Inventor: Takashi Kanno, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/125,182

(22) Filed: May 10, 2005

(65) Prior Publication Data

US 2005/0200930 A1    Sep. 15, 2005

Related U.S. Application Data

(62) Division of application No. 10/421,793, filed on Apr. 24, 2003, now Pat. No. 6,937,264.

(30) Foreign Application Priority Data

May 10, 2002  (JP) .............................. 2002/134965
Apr. 8, 2003  (JP) .............................. 2003/104078

(51) Int. Cl.
  *B41J 2/435* (2006.01)
(52) U.S. Cl. ...................... 347/250; 347/234
(58) Field of Classification Search ........ 347/234–237, 347/239, 248–251, 255; 358/451–453, 448, 358/537; 386/112; 101/485
See application file for complete search history.

(56) References Cited

U.S. PATENT DOCUMENTS

| 4,730,223 A * | 3/1988 | Ikeda et al. .................. 386/112 |
|---|---|---|
| 4,872,065 A | 10/1989 | Isono et al. .................. 358/494 |
| 4,942,406 A * | 7/1990 | Tsuda ........................ 347/251 |
| 5,815,287 A * | 9/1998 | Yamada ....................... 358/448 |
| 5,933,184 A * | 8/1999 | Ishigami et al. ............. 347/249 |
| 6,628,424 B1 * | 9/2003 | Sakurai ....................... 358/1.9 |
| 6,650,197 B1 | 11/2003 | Sekiya ....................... 332/109 |
| 6,667,756 B1 | 12/2003 | Conrow et al. .............. 347/248 |
| 6,729,239 B1 * | 5/2004 | Edamitsu et al. ........... 101/485 |
| 6,731,414 B1 | 5/2004 | Ito ............................. 358/537 |
| 6,937,264 B1 * | 8/2005 | Kanno ........................ 347/250 |
| 2002/0167680 A1 | 11/2002 | Sakurai ....................... 358/1.9 |

FOREIGN PATENT DOCUMENTS

| EP | 1030265 | 8/2000 |
|---|---|---|
| JP | 2000-238342 | 9/2000 |
| JP | 2001-005245 | 1/2001 |
| JP | 3539283 | 4/2004 |

* cited by examiner

*Primary Examiner*—Hai Pham
(74) *Attorney, Agent, or Firm*—Fitzpatrick, Cella, Harper & Scinto

(57) ABSTRACT

To provide a laser scanning control apparatus for driving a light source adapted to emit a laser beam in accordance with image data defined in pixels to scan an image bearing member in a main scanning direction with the laser beam emitted from the light source through a rotating polygon mirror, the laser scanning control apparatus being characterized by including a correction portion for, every one or more correction points on a main scanning line of the image bearing member to be scanned with the laser beam, extending the pixel length for each pixel located in the correction point concerned to thereby correct the scanning magnification of the main scanning line, and for changing the rotational speed of the rotating polygon mirror to correct the magnification in a sub scanning direction to thereby correct the output magnification.

9 Claims, 11 Drawing Sheets

FIG. 9

EXTENSION PIXEL NUMBER DATA TABLE

| | SHEET TYPE A | SHEET TYPE B | SHEET TYPE C | SHEET TYPE D |
|---|---|---|---|---|
| EXTENSION PIXEL NUMBER DATA (FRONT SURFACE) | 2 | 5 | 8 | 10 |
| EXTENSION PIXEL NUMBER DATA (BACK SURFACE) | 0 | 3 | 5 | 6 |

REFERENCE PERIOD TABLE

| | SHEET TYPE A | SHEET TYPE B | SHEET TYPE C | SHEET TYPE D |
|---|---|---|---|---|
| BD SIGNAL REFERENCE PERIOD (FRONT SURFACE) | 100.03% | 100.07% | 100.11% | 100.14% |
| BD SIGNAL REFERENCE PERIOD (BACK SURFACE) | 100.00% | 100.04% | 100.07% | 100.08% |

# LASER SCANNING CONTROL APPARATUS

This application is a division of application Ser. No. 10/421,793, filed Apr. 24, 2003, the contents of which is incorporated herein by reference.

BACKGROUND OF THE INVENTION

1. Field of the Invention

The present invention relates to a laser scanning control apparatus for forming a latent image on a latent image bearing member by scanning the latent image bearing member with a laser beam emitted from a laser light source.

2. Related Background Art

In general, in an image forming apparatus such as a laser beam printer or a digital copying machine, a semiconductor laser is driven with a laser beam driving circuit, a laser beam emitted from the semiconductor laser is modulated with an image signal, and a photosensitive drum is raster-scanned with the laser beam after the modulation using a rotating polygon mirror to thereby form a latent image.

At this time, in the apparatus having a plurality of semiconductor lasers, there is a problem in that the magnification of a latent image differs depending on the position on a photosensitive drum illuminated with the laser beams emitted from the respective semiconductor lasers. In addition, in the double-sided printable image forming apparatus, there is a problem in that heat of a fixing unit evaporates moisture contained in a sheet material so that a paper after fixing contracts in size, whereby even if ratios of the latent images on both the surfaces are identical to each other, the image sizes after printing are different from each other.

In contrast, there has been proposed a method in which, in order to obtain adjustment between them, an image clock signal with which image data is transferred is added at an arbitrary point to control the length between the image data to thereby correct the size of the image to be printed (refer to for example, Japanese Patent Application Laid-Open No. 2000-238342).

However, in the above-mentioned prior art, there is a possibility that since the image clock signal is corrected, the image data to be interpolated is fixed, and hence a space is generated in the position where the image clock signal is minutely lengthened to impair the printing quality.

SUMMARY OF THE INVENTION

In the light of the foregoing, the present invention has been made in order to solve the above-mentioned problems associated with the prior art, and it is therefore a first object of the present invention to provide a laser scanning control apparatus which is capable of correcting suitably the main scanning magnification and the sub scanning magnification without impairing the printing quality. In addition, the present invention aims at increasing the number of image PWM (Pulse Width Modulation) signals and the number of high-frequency clock signals constituting image clock signals to extend the period for a predetermined number of pixels, determined by controlling a pixel counter, of latent image pixels formed with a laser beam, and aims at changing a rotational speed of a rotating polygon mirror to increase or decrease the number of lines in a sub scanning direction to thereby remove a difference in magnification between an image read using an image reading portion which has been conventionally provided with no correction means, and an image outputted from the image forming apparatus, or a difference in magnification between a front surface image and a rear surface image during the double-sided printing in order to realize the high picture quality of an image.

In order to attain the above-mentioned first object, according to a first aspect of the present invention, there is provided a laser scanning control apparatus for driving a light source adapted to emit a laser beam in accordance with image data defined in pixels to scan an image bearing member in a main scanning direction with the laser beam emitted from the light source through a rotating polygon mirror. The laser scanning control apparatus is characterized by including a correction portion for, every one or more correction points on a main scanning line of the image bearing member to be scanned with the laser beam, extending the pixel length for each pixel located in the correction point concerned to thereby correct the scanning magnification of the main scanning line, and for changing the rotational speed of the rotating polygon mirror to correct the magnification in a sub scanning direction to thereby correct the output magnification.

The above and other objects, features, and advantages of the invention will become more apparent from the following detailed description taken in conjunction with the accompanying drawings.

BRIEF DESCRIPTION OF THE DRAWINGS

FIG. 9 is a diagram showing a table of extension pixel number data and a reference period;

DETAILED DESCRIPTION OF THE PREFERRED EMBODIMENTS

Figure 1:
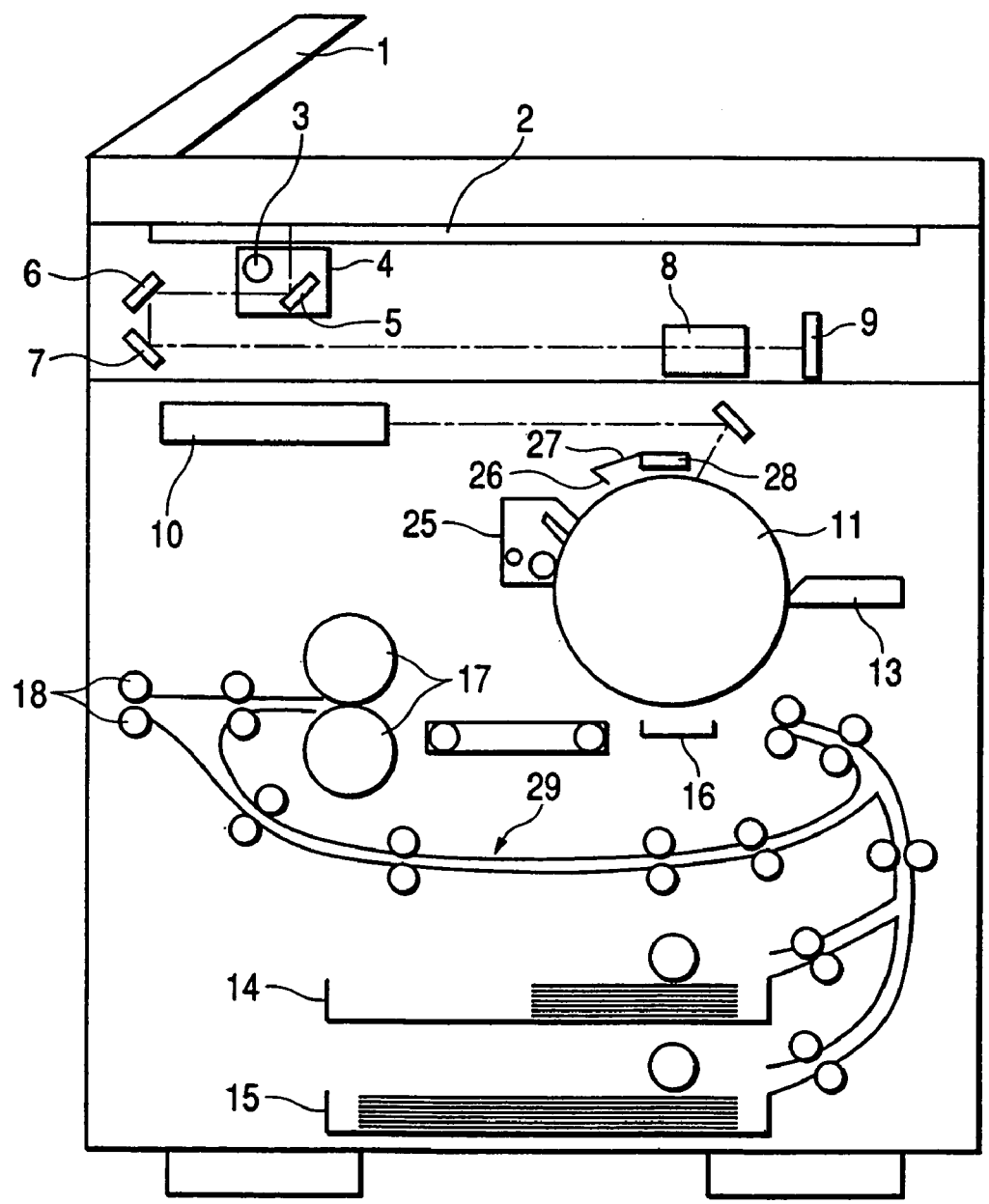
FIG. 1 is a schematic view showing a construction of a color image forming apparatus according to the present invention.

The present invention will now be described in detail below with reference to the accompanying drawings showing a preferred embodiment thereof. In the drawings, elements and parts which are identical throughout the views are designated by identical reference numeral, and duplicate description thereof is omitted.

The preferred embodiment of the present invention will hereinafter be described in detail with reference to the accompanying drawings.

FIG. 1 is a longitudinal section showing schematic construction of an image forming apparatus according to an embodiment of the present invention. The image forming apparatus includes an original sheet feeding apparatus 1 which can be loaded with a plurality of sheets of originals, and a scanner unit 4 adapted to be moved in a sub scanning direction. The original sheet feeding apparatus 1 conveys a plurality of sheets of originals with which the original sheet feeding apparatus 1 is loaded from the head onto an original base glass 2 one sheet by one sheet. The scanner unit 4 is loaded with a lamp 3 for illuminating the original conveyed onto the original base glass 2, and a reflecting mirror 5 for introducing the reflected light from the original on the original base glass 2 into a reflecting mirror 6. The reflecting mirror 6 introduces the reflected light from the reflecting mirror in conjunction with a reflecting mirror 7 into a lens 8. Then, the lens 8 images the reflected light on an image sensor portion 9. The image sensor portion 9 converts the light thus imaged thereon into an electrical signal which is in turn subjected to a predetermined processing to be inputted as an image signal to an exposure control portion 10.

The exposure control portion 10 emits a laser beam on the basis of the image data inputted thereto and scans a photosensitive drum 11 with the laser beam for exposure. A latent image corresponding to the laser beam is formed on the photosensitive drum 11 through the scanning for exposure with the laser beam. The latent image formed on the photosensitive drum 11 can be formed into a visible image as a toner image by a toner supplied from a developing device 13.

In addition, a sheet is fed from a cassette 14 or a cassette 15 at a timing synchronized with the start of illumination with the laser beam, and the sheet is conveyed towards a transferring portion through a conveying path. A toner image on the photosensitive drum 11 is transferred onto the conveyed sheet by a transferring portion 16. The sheet onto which the toner image has been transferred is then conveyed to a fixing portion 17.

In the fixing portion 17, the toner image on the sheet is fixed on the sheet through the thermal pressing. The sheet which has passed through the fixing portion 17 is discharged to the outside through a pair of sheet discharging rollers 18. The surface of the photosensitive drum 11, after the transferring of the toner image, is cleaned by a cleaner 25, and then the electric charges thereon are removed by an auxiliary electrifier 26. Then, the remaining electric charges on the surface of the photosensitive drum 11 are erased by a pre-exposure lamp 27 to provide the state in which the satisfactory electrostatic charge is obtained in a primary electrifier 28. Then, the surface of the photosensitive drum 11 is electrified by the primary electrifier 28.

The above-mentioned series of processes are repeatedly carried out to allow the images to be formed on a plurality of sheets.

In addition, in this image forming apparatus, there is provided a double-sided path 29 adapted to make a double-sided printing possible. During the double-sided printing, a sheet after the one side printing is reversed to be introduced into the double-sided path 29. This sheet is then conveyed again to the photosensitive drum 11 through the double-sided path 29. Then, on the other surface of the sheet, similarly to the foregoing, the corresponding image is formed.

Figure 2:
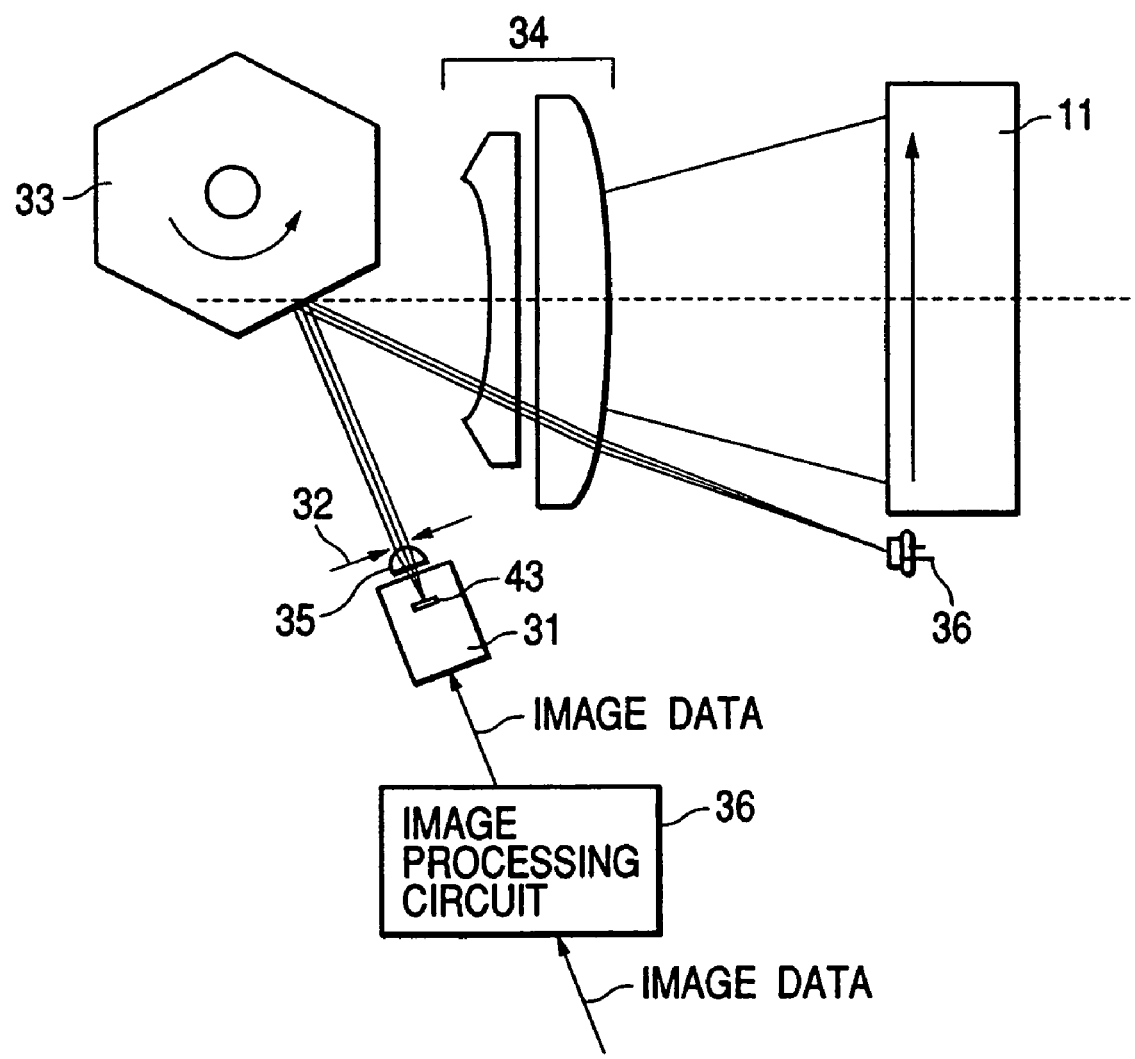
FIG. 2 is a block diagram showing schematically a construction of an exposure control portion of an image forming apparatus.

FIG. 2 is a block diagram schematically showing the construction of the exposure control portion 10 shown in FIG. 1. The exposure control portion 10 includes an image processing circuit 36 for pixel-modulating image data inputted from the outside to output the pixel-modulated image signal synchronously with an image clock signal, and a laser driver 31 for driving a semiconductor laser 43 on the basis of the pixel-modulated image data outputted from the image processing circuit 36. A photodiode sensor (PD sensor (not shown)) for detecting a part of the laser beam is provided inside the semiconductor laser 43. The laser driver 31 carries out the APC (Auto Power Control) of the semiconductor laser 43 using a detection signal of the PD sensor. The laser beam emitted from the semiconductor laser 43 becomes substantially a parallel beam through the optical system having a collimator lens, an iris and the like to be made incident to a polygon mirror (rotating polygon mirror) 33 with a predetermined beam diameter being held. The polygon mirror 33 is being rotated in a predetermined direction at an equal angular velocity. Then, along with this rotation, the laser beam made incident to the polygon mirror 33 is reflected in the form of a deflecting beam the angle of which is continuously changed. The laser beam reflected in the form of a deflecting beam suffers a condensing function of an f-θ lens 34. At the same time, since the f-θ lens 34 carries out such a correction for the distortion aberration as to ensure the time linearlity of a scanning, the laser beam which passed through the f-θ lens 34 is coupled onto the photosensitive drum 11 for the scanning in a predetermined direction at an equal velocity. A beam detection sensor 37 for detecting the laser beam reflected by the polygon mirror 33 is provided in the vicinity of one end portion of the photosensitive drum 11, and a detection signal of this sensor 37 is used as a synchronous signal in accordance with which the rotation of the polygon mirror 33 is synchronized with the operation for writing the data.

In such a laser driver 31, for the purpose of holding a fixed amount of light of the laser beam during one scanning, there is adopted a driving system in which the output of the laser beam is detected at the light detection interval during one scanning to hold the driving current for the semiconductor laser 43 for one scanning.

Figure 3:
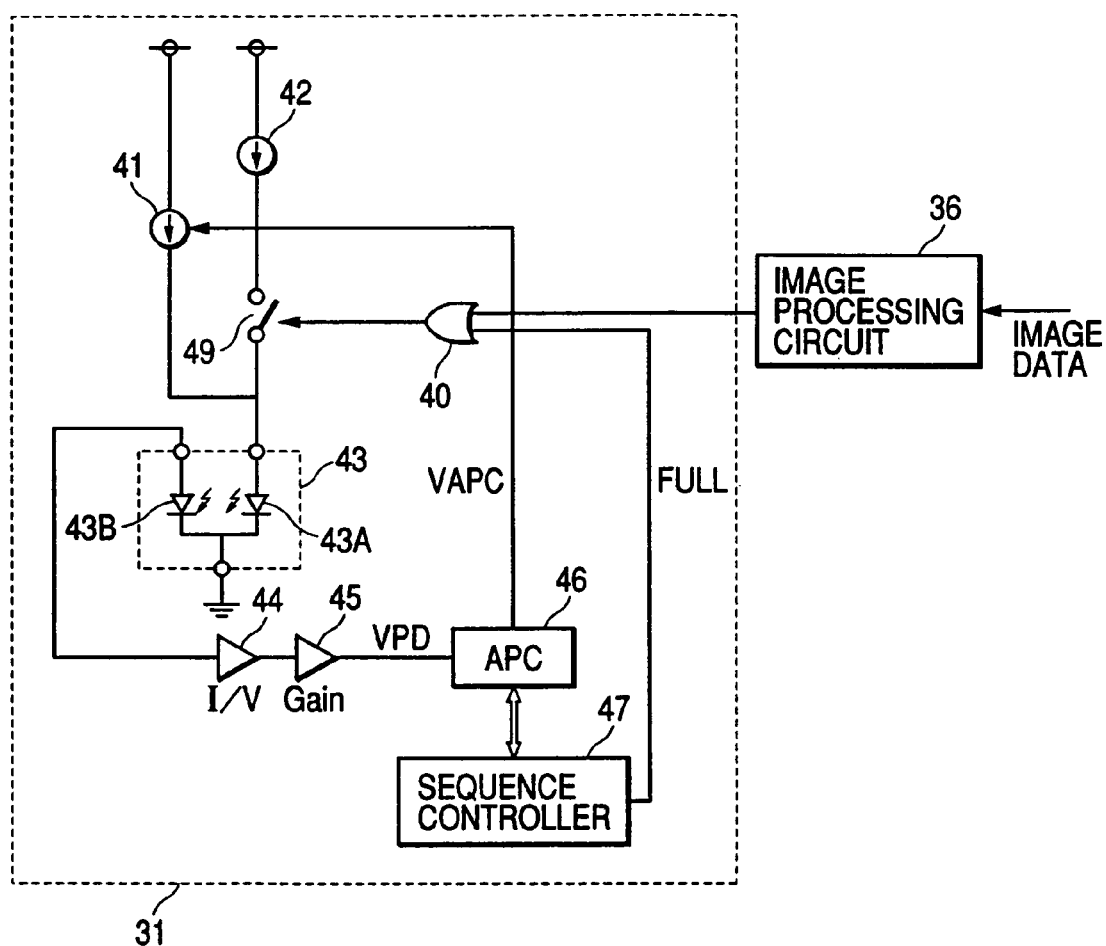
FIG. 3 is a circuit diagram, partly in block diagram, showing a construction of a laser scanning control apparatus.

FIG. 3 is a circuit diagram, partly in block diagram showing a construction of a laser driver shown in FIG. 2. There is used a laser chip 43 constituted by one laser 43A and one photodiode (hereinafter referred to as "PD") sensor 43B. Then, two current sources of a bias current source 41 and a pulse current source 42 are applied to the laser chip 43 to thereby improve the emission characteristics of the laser 43A. In addition, for the stabilization of the emission of the laser 43A, an output signal from the PD sensor 43B is fed back to the bias current source 41 to carry out the automatic control for an amount of bias current.

That is, a logical element 40 outputs an ON signal to a switch 49 in accordance with a full lighting signal from a sequence controller 47, whereby the sum of currents from the bias current source 41 and the pulse current source 42 is caused to flow through the laser chip 43, and an output signal at this time from the PD sensor 43B is inputted to a current-to-voltage converter 44, and then is amplified in an amplifier 45 to be inputted to an APC circuit 46 to thereby be supplied as a control signal from the APC circuit 46 to the bias current source 41. This circuit system is called the APC (Auto power Control) circuit system which is currently generally known as the circuit system for driving a laser.

A laser has temperature characteristics, and hence an amount of current required to obtain a fixed amount of light is further increased as the temperature rises. In addition, since the laser is heated by itself, when the fixed current is only supplied, the fixed amount of light cannot be obtained, which exerts a serious influence on the image formation. As the means for solving this problem, the fixed amount of current to be caused to flow is controlled each scanning using the above-mentioned APC circuit system each scanning so that emission characteristics for each scanning become fixed. Thus, a switch 49 is turned ON/OFF in accordance with the data modulated by an image processing circuit 36 to form an image using the laser beam of which the amount of light is controlled to become fixed.

Figure 4:
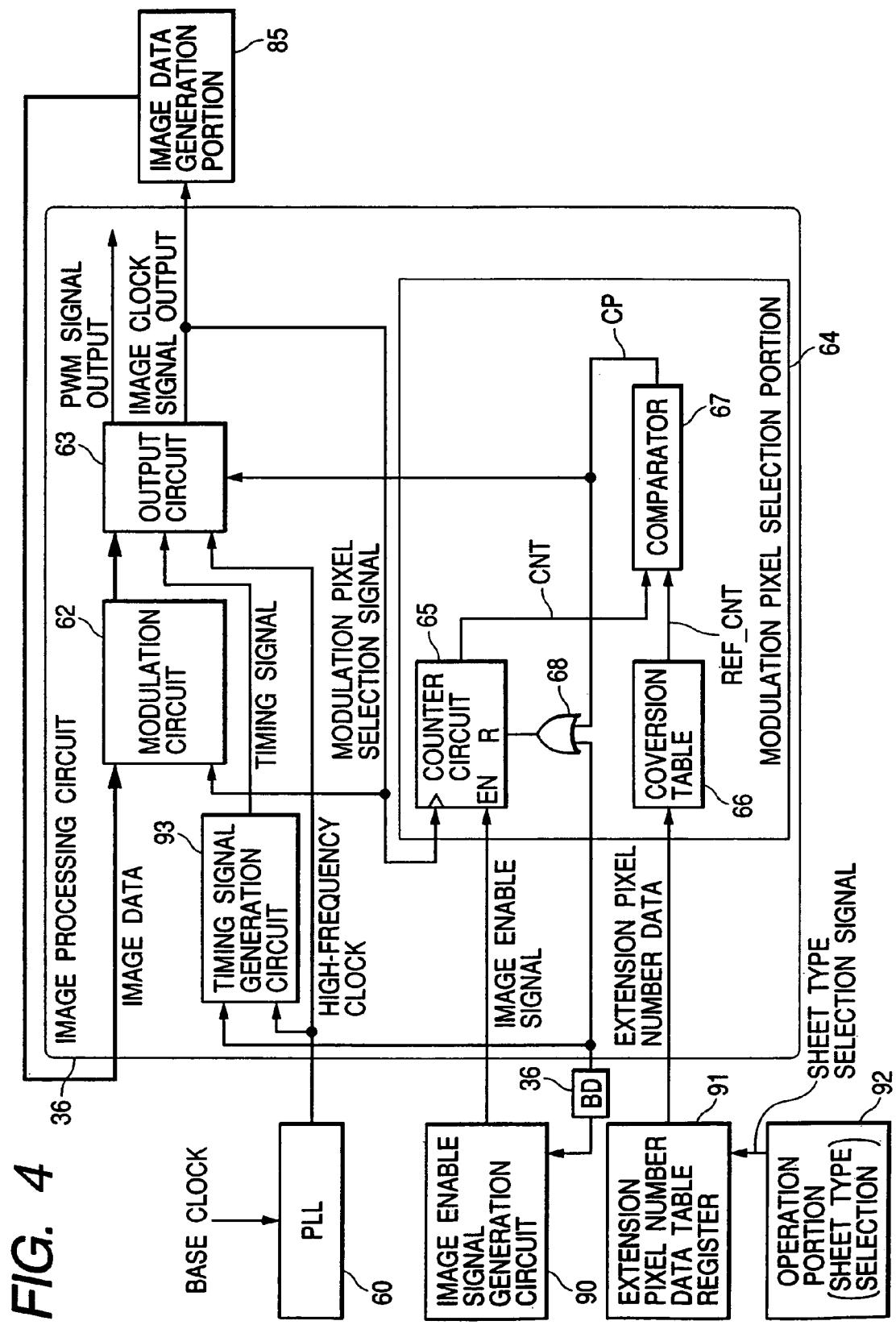
FIG. 4 is a block diagram, partly in circuit diagram, showing a construction of an image processing circuit and its peripheral circuit.

FIG. 4 is a block diagram showing a construction of the image processing circuit shown in FIG. 3 and its peripheral circuit. A high-frequency clock signal which is to be inputted to an output circuit 63 is outputted from a PLL 60 and has a frequency N times as large as that of a basic clock signal. A modulation circuit 62 of the above-mentioned image processing circuit 36 modulates image data. Since a lighting time within a unit time is often controlled with a PWM modulation in order to evaluate the gradation of a laser, the description here will now be given as the description concerned with the PWM modulation (in particular, the digital PWM modulator). When input data having A bits, for example, is subjected to the PWM modulation, it is converted into a pulse width signal having $2^A$ bits. Here, a constant is determined so as to meet the relationship of $2^A$=n.

The modulation circuit 62 generates the pulse width signal from the image data inputted thereto to transmit the pulse width signal to an output circuit 63. The output circuit 63 outputs therethrough a PWM signal synchronized with a high-frequency clock signal outputted from the PLL circuit 60 and an image clock signal synchronized with the high-frequency clock signal, in accordance with the pulse width signal obtained from the modulation circuit 62, to transmit the PWM signal and the image clock signal to the laser driver and the image data generating portion 85, respectively.

Figure 5:
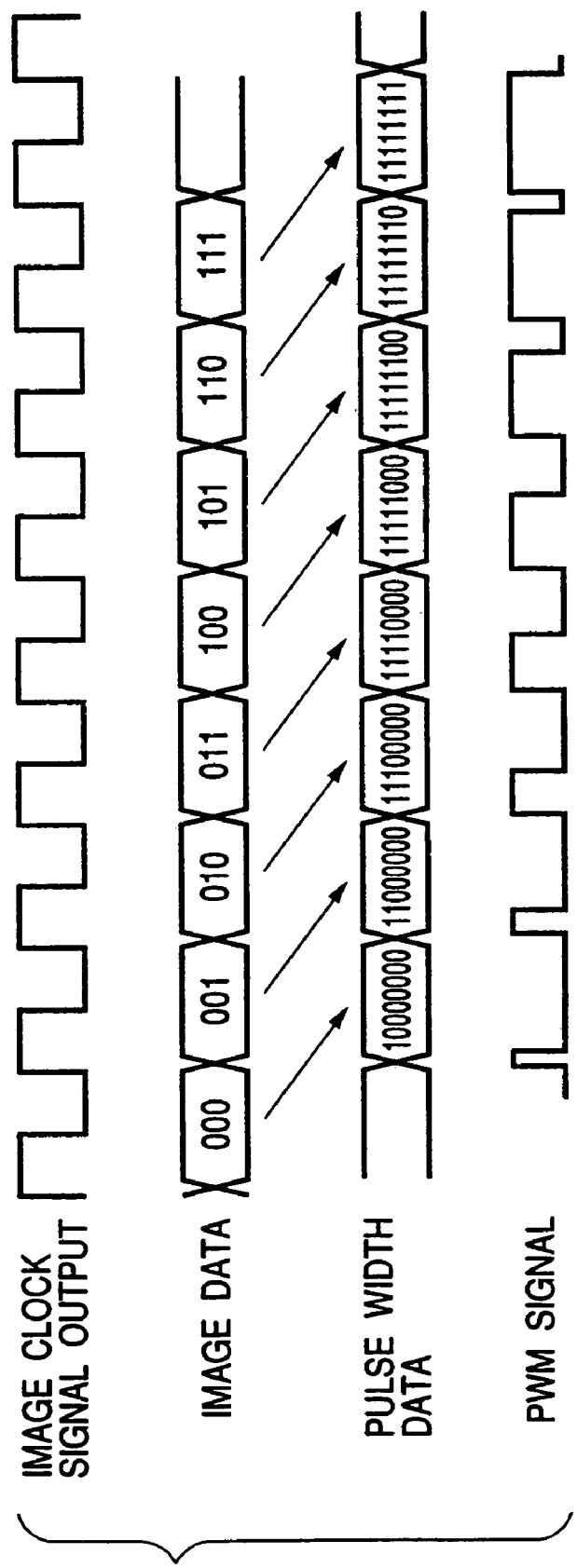
FIG. 5 is a timing chart showing an example of generation of a PWM signal in the image processing circuit.

FIG. 5 shows the situation in which 3-bits data is inputted as the image data to the modulation circuit 62, and the 3-bits data is in turn outputted in the form of a pulse width data of 8 bits, and then, the PWM signal is outputted through the output circuit 63 on the basis of the pulse width data.

Figure 6:
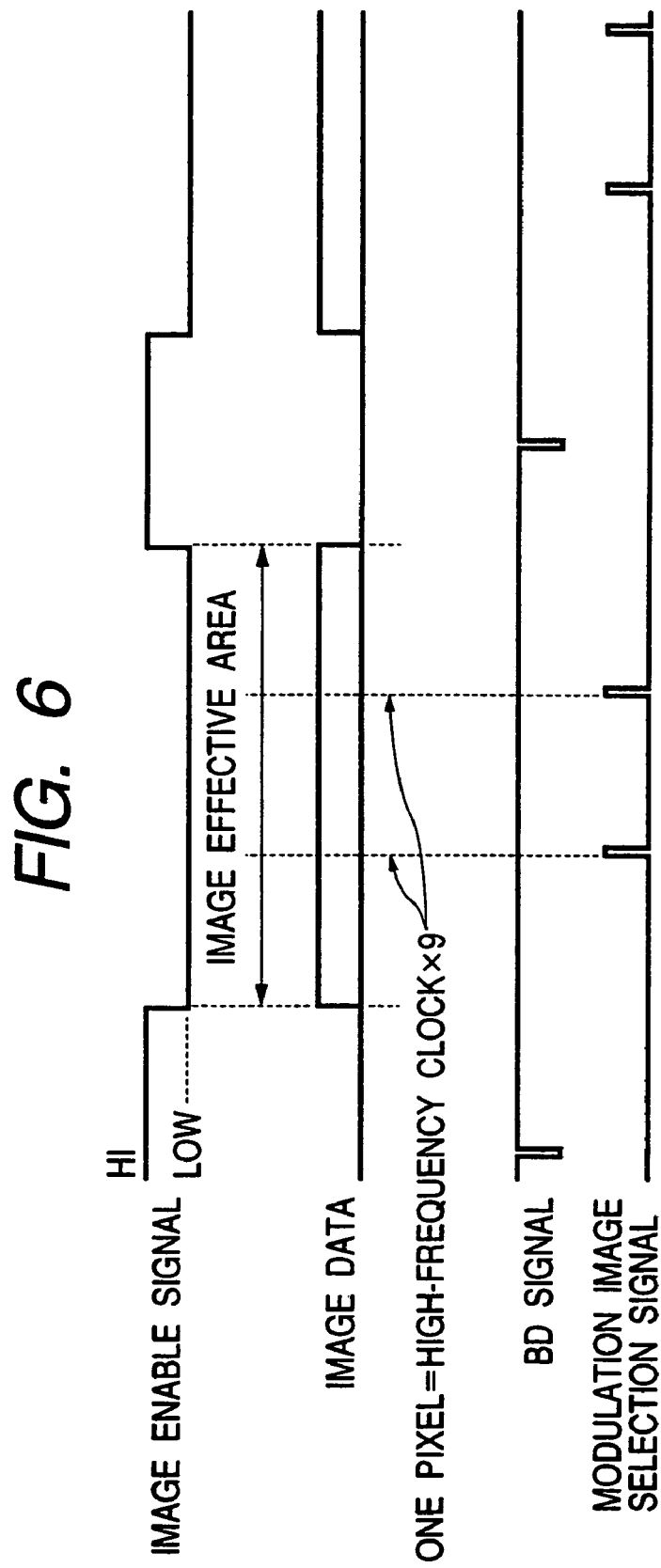
FIG. 6 is a timing chart showing an operation for selecting a pixel width extension pixel.

A count value of a counter circuit 65 is incremented in an image enable signal (the image enable signal of FIG. 6 is at the level Low, i.e., resides in an image effective area) generated in an image enable signal generation circuit 90 on the basis of an input of an image clock signal. In addition, the count value of the counter circuit 65 is reset in an invalid image area (the image enable signal is at the level Hi) on the basis of an output signal BD of the BD sensor 36 through an OR gate 68, while it is reset in an effective image area on the basis of an output signal CP of a comparator 67. Extension pixel number data, as an information of the number of pixels, stored in a register 91 and used to extend a width on a scanning line is converted into a value REF_CNT which is obtained by dividing the number of pixels on one scanning line by a value obtained by adding 1 to the extension pixel number data in a conversion table 66.

Figure 7:
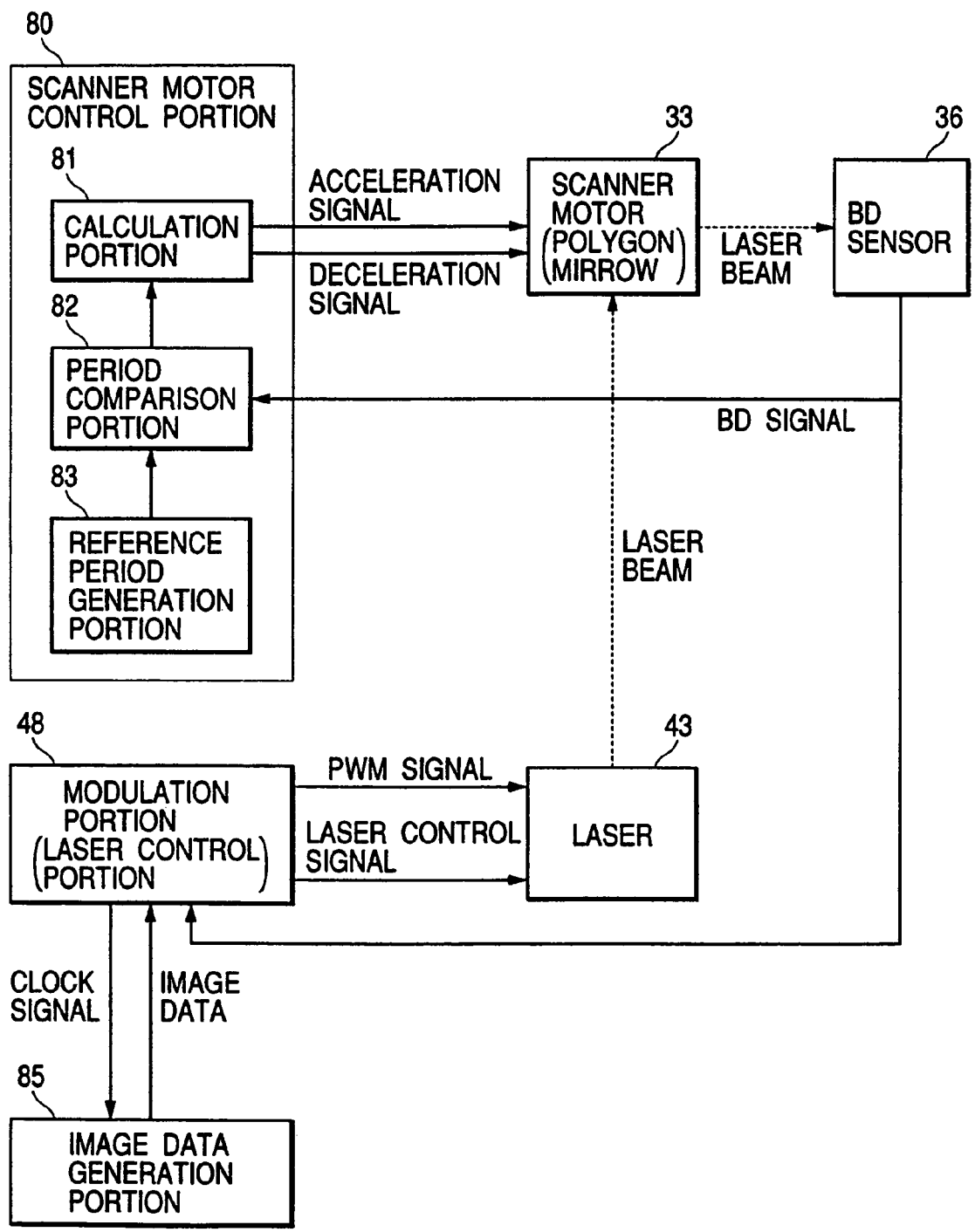
FIG. 7 is a block diagram showing a construction of a control portion of a scanner motor.

For example, in the case where an extension pixel number data table of FIG. 9 is present in an extension pixel number data table register 91, a sheet type A therein is selected by an operation portion 92 of FIG. 4, and 7,200 pixels are present on one scanning line. If 2 is set as the extension pixel number data and an image is intended to be formed on a surface of a sheet material, the value REF_CNT=2400 which is set as the value corresponding to this set value in the conversion table 65 is outputted. A comparator 67 compares CNT to REF_CNT. If CNT and REF_CNT agree with each other, then the comparator 67 outputs an agreement output signal CP at the level Hi. This output signal CP is transmitted as a modulation pixel selection signal to the output circuit 63. During a formation of an image on a back surface of a sheet material at this time, 0 is set as data of the back surface of the extension pixel number data table shown in FIG. 9 so that the image is prevented from being extended.

Note that, for the extension pixel number data, a procedure may also be adopted such that a value is set which is obtained by dividing a difference Xc of the image in the main scanning direction shown in FIG. 1 by an extension width per pixel after an amount of moisture contained in the sheet material of the sheet materials having several kinds of materials as shown in table of FIG. 9 when the image read by the image reading portion, or the double-sided printing is outputted by the image forming apparatus is detected by a humidity sensor or the like, and a difference in line length between a sheet original and an output image is detected by a CCD or the like.

When a modulation pixel selection portion 64 is transmitting a modulation pixel selection signal to the output circuit 63, the operation of the output circuit is different from the normal operation thereof. Normally, the output circuit 63 generates one period (of the image PWM signal and the image clock signal) with n high-frequency clock signals, whereas only at this time, the output circuit 63 outputs the PWM data and the clock signal which is different from that period. In this embodiment, a construction in which one period is generated with (n+1) high-frequency clocks will be shown hereinbelow.

Figure 10:
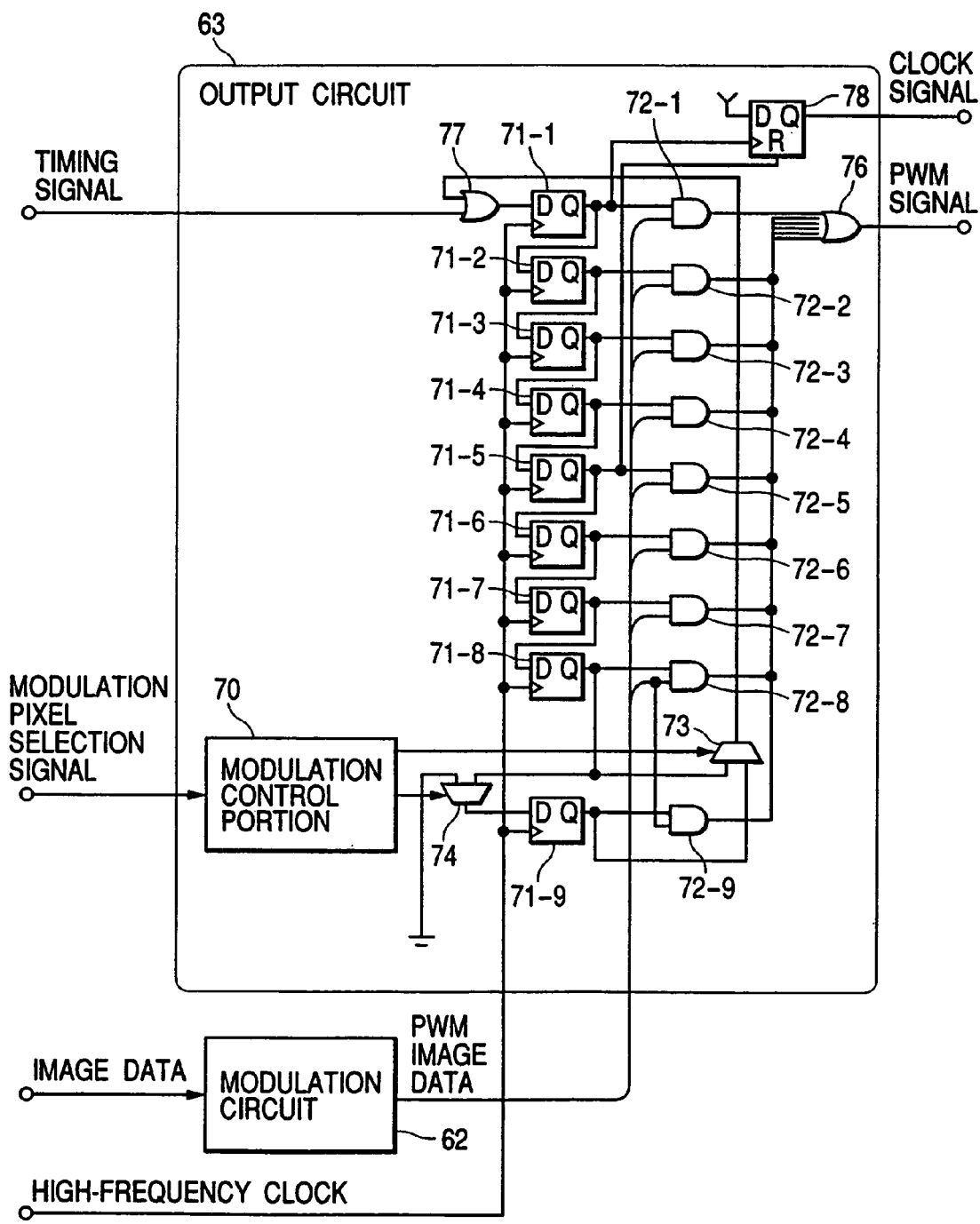
FIG. 10 is a circuit diagram, partly in block diagram, showing a construction of a modulation circuit, and an output circuit.

Next, FIG. 10 is a circuit diagram, partly in block diagram, showing a construction of the modulation circuit 62 and the output circuit 63. The image data is inputted to the modulation circuit 62 to be modulated into pulse width data of 8 bits in the figure, and the bits are inputted to one of terminals of 2-inputs AND circuits 72-1 to 72-8. In addition, the same data as that inputted to the 2-inputs AND circuit 72-8 is inputted to one terminal of the 2-inputs AND circuit 72-9. Reference numerals 71-1 to 71-9 designate D type flip-flops, and each of them serves to output an input signal at a terminal D at a rising edge of the high-frequency clock to a terminal Q. These D type flip-flops 71-1 to 71-9 are connected to the other input terminals of the 2-inputs AND circuits 72-1 to 72-9, respectively. Then, the flip-flops 71-1 to 71-8 are connected in such a cascade style that the output terminal Q of the flip-flop 71-1 is connected to the input terminal D of the flip-flop 71-2, the output terminal Q of the flip-flop 71-2 is connected to the input terminal D of the flip-flop 71-3, and so forth. In addition, the output terminal Q of the flip-flop 71-8 is also connected to one terminals of a 2-inputs selector circuit 73 and a 2-inputs selector circuit 74. The output terminal Q of the flip-flop 71-9 is also connected to the other terminal of the 2-inputs selector circuit 73.

The output terminals of the 2-inputs AND circuits 72-1 to 72-9 are connected to a 9-inputs OR circuit 76, which serves to output an output signal as the PWM signal. The 2-inputs selector circuit 73 selects between the output signals of the flip-flops 71-8 and 71-9 in accordance with an output signal of the modulation control portion 80 and its output terminal is connected to one of input terminals of a 2-inputs OR circuit 77. The other input terminal of the 2-inputs selector circuit 74 is connected to GND. In the case of the 2-inputs selector circuit 74, whether or not an output signal of the flip-flop 71-8 should be inputted to the flip-flop 71-9 is controlled in accordance with the output signal of a modulation control portion 70. The modulation control portion 70 switches the selectors of the selector circuits 73 and 74 over to predetermined values on the basis of a modulator pixel selection signal outputted from the comparator 67.

Reference numeral 78 designates a flip-flop for outputting a clock signal. Then, the flip-flop 78 latches a power supply voltage at the level Hi of a power supply at a rising edge of the pulse outputted by the flip-flop 71-1 to reset the level Hi to the level Low on the basis of the output pulse of the flip-flop 71-5 to thereby generate the clock signal (for 8 high-frequency clock signals or 9 high-frequency clock signals) having the same period as that for which the data circularly passes through the flip-flops 71-1 to 71-8 or 71-9. A timing signal is inputted to the other input terminal of the 2-inputs OR circuit 77 of which the output signal is in turn inputted to the flip-flop 71-1.

Next, the operation of the output circuit 63 will hereinbelow be described. The output circuit 63 receives as its input a signal, in the form of a timing signal, which has been outputted from a timing signal generation circuit 93 synchronously with the high-frequency clock signal inputted to each of the flip-flops 71-1 to 71-9, and which has a width for one high-frequency clock signal. As a result, a level of one of the output signals of the ring-like shift registers constituted by the flip-flops 71-1 to 71-9 always goes "1". The modulation control portion receives as its input a pixel selection signal outputted from the modulation pixel selection portion 64 to switch the selector circuits 73 and 74 over to each other so as to control the size of the above-mentioned ring-like shift registers. In the case where one pixel is composed of the 8 high-frequency clock signals, the selector circuit 73 selects the output signal of the flip-flop 71-8, and the selector circuit 74 selects GND.

In the case of composing one pixel, the selector circuit 73 selects the output signal of the flip-flop 71-9 or the output signal of the flip-flop 71-8, and the selector circuit 74 selects the output signal of the flip-flop 71-8 or GND. "1" is outputted every 9 or 8 high-frequency clocks from the flip-flops 71-1 to 71-9 through these switching operations. The 2-inputs AND circuits 72-1 to 72-9 have the PWM image data set therein and change the data every pixel. The 2-inputs AND circuits 72-1 to 72-9 subject the data set therein and "1" outputted every 8 or 9 high-frequency clocks to the AND arithmetic operation to subject the AND output signals to the OR arithmetic operation to thereby allow the PWM signal composed of the 8 or 9 high frequency clocks to be outputted.

Figure 8:
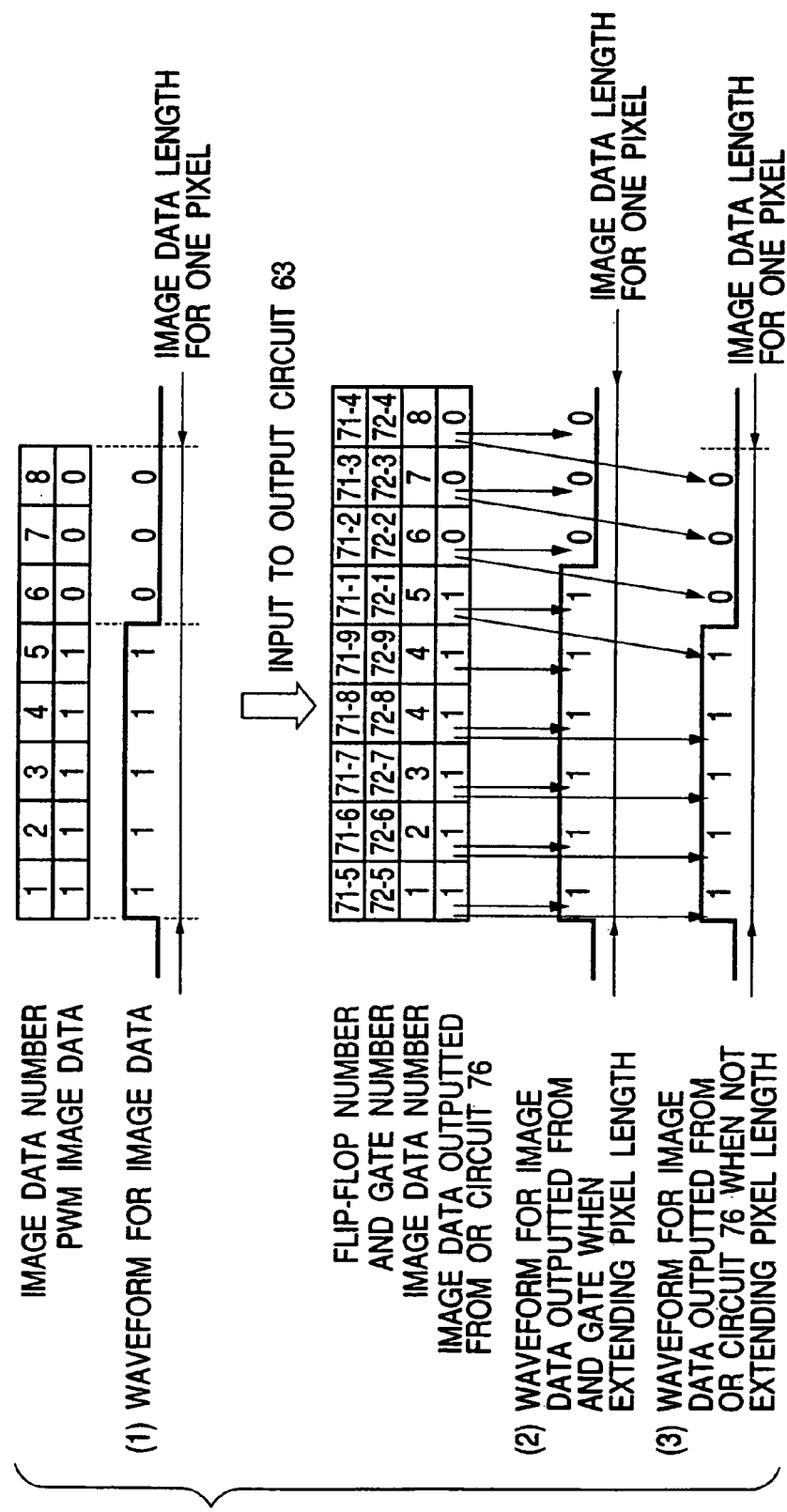
FIG. 8 is a diagram useful in explaining PWM image data.

Here, the PWM image data will hereinbelow be described by giving an example using FIGS. 8 and 10. It is assumed that the image data of one pixel is started from the data outputted from the flip-flop 71-5 (the AND circuit 72-5). A waveform of the input image data of one pixel is shown in a part (1) of FIG. 8. Let us consider the case where the PWM image data having a waveform as shown in a part (1) of FIG. 8 is inputted to the 2-inputs AND circuits 72-1 to 72-8. In the case where the pixel length is extended, the selector circuit 74 is operated so that the output signal of the flip-flop 71-8 is inputted to the flip-flop 71-9, whereby as in the waveform shown in a part (2) of FIG. 8, the image data of the image data number 4 of the flip-flop 71-8 is outputted again right after the image data outputted from the flip-flop 71-8.

As a result, the image data of the image data number 4 is inputted to one pixel by two so that the image data is obtained for which the pixel extension has been carried out. On the other hand, in the case where no pixel length is extended, the selector circuit 74 is operated so that the output signal of the flip-flop 71-8 is prevented from being inputted to the flip-flop 71-9, whereby the image data of the image data number 4 is inputted to one pixel by only one. As a result, the image data is obtained for which no pixel extension has been carried out.

Figure 11:
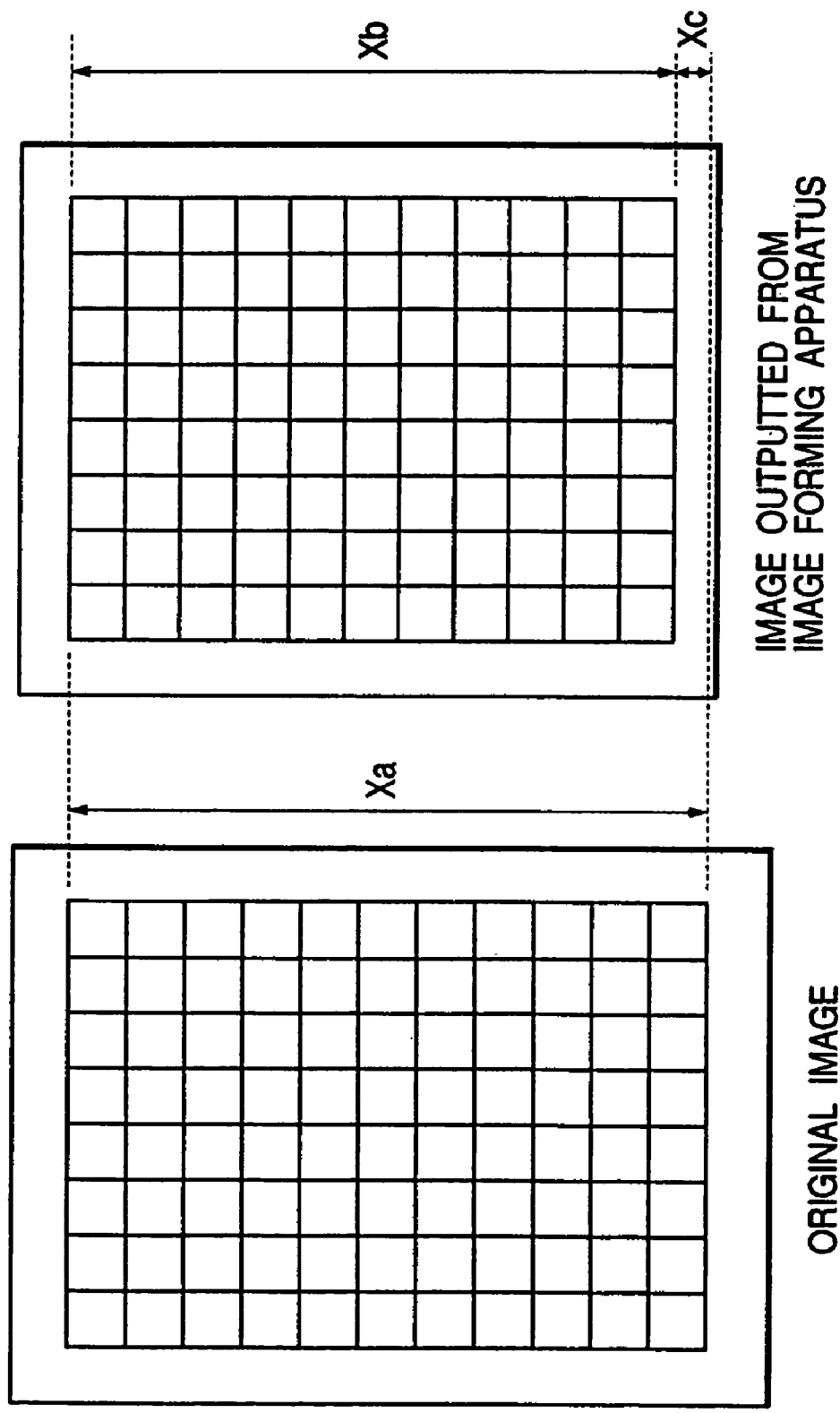
FIG. 11 is a diagram showing a difference in magnification between an original image and an image outputted from the image forming apparatus.

FIG. 6 shows a timing chart useful in explaining an operation for correcting the scanning line length in the modulation portion configured as described above. In FIG. 6, it is assumed that 2 is set as a modulation pixel number data, and REF_CNT=2400 is outputted from the conversion table. As shown in FIG. 6, when the output value CNT of a counter 65 has reached 2,400 in the effective image area of one scanning, a level of an agreement output signal CP of the comparator 67 goes Hi, and the output CNT is reset by the subsequent input of the clock signal. The counter 65 repeatedly carries out this operation, and thus the agreement output signal CP at the level Hi is transmitted two times as the modulation pixel selection signal to the output circuit 63 so that the pixels located substantially at even intervals on one scanning line are extended. The output circuit 63, only when the agreement output signal CP at the level Hi is transmitted thereto, carries out the setting so that the constitution of one pixel becomes the width for the 9 high-frequency clock signals, while it carries out the control in other cases so that the constitution of one pixel becomes the width for the 8 high-frequency clock signals. Thus, the magnification difference between an original image in magnification Xa and an image on the sheet material outputted from the image forming apparatus in magnification Xb of FIG. 11 can be electrically corrected to make Xa and Xb equal to each other.

Next, the description will hereinbelow be given with respect to the basic operation of the rotating polygon mirror with reference to FIGS. 2 and 7. The rotating polygon mirror 33 is rotated at a predetermined rotational speed by a motor (not shown). For an operation of the motor, a scanner motor control portion shown in FIG. 7 carries out the control so that a period of a BD signal which is detected every line by a BD sensor 36 is compared with a reference period generated by a reference period generation portion 83 in a period comparison portion 82, and an acceleration/deceleration signal is outputted from a calculation portion 81 so as for the period to become the target period in order to rotate the motor stably.

The reference period table shown in FIG. 9 is stored in the reference period generation portion 83. Then, for example, it is assumed that when a BD signal reference period for forming an image on a sheet of a type which does not contract after fixing the toner image thereon is 100.00%, a sheet type A is selected by the operation portion 92 shown in FIG. 4. When an image is formed on the front surface of the sheet at this time, the BD signal reference period (front surface) of the sheet type A in the table shown in FIG. 9 is referred to make the BD signal reference period 100.03%. Subsequently, when an image is formed on the back surface of the sheet, the BD signal reference period (back surface) of the sheet type A in the table of FIG. 9 is referred to make the BD signal reference period 100.00%. Thus, the scanner motor is controlled to form the image. That is, the scanner motor is controlled so that the target period for the BD signal is shortened to increase the rotational speed of the rotating polygon mirror, whereby the image is extended in the sub scanning direction.

Note that, in this embodiment, the description has been given with respect to the double-sided printable image forming apparatus. However, even in an image forming apparatus which is capable of scanning simultaneously different lines with a plurality of laser beams, e.g., two laser beams, the scanning magnifications due to each laser beam can be corrected so as to become identical to each other through the above-mentioned scanning magnification correction processing. In this case, out of the laser beams, the scanning magnification due to one laser beam may be corrected so that the scanning magnification due to the one laser beam agrees with the scanning magnification due to the other laser beam, or the scanning magnification due to the respective laser beams may be individually corrected. In addition, it is to be understood that the above-mentioned scanning magnification correction processing may be applied to the correction for the scanning magnifications among colors in an image forming apparatus having exposure means (photosensitive drums) for yellow, magenta, cyanogen and black.

While the present invention has been particularly shown and described with reference to the preferred embodiment and the specific change thereof, it will be understood that other changes and various modifications will occur to those skilled in the art without departing from the scope and true spirit of the invention. The scope of the invention is, therefore, to be determined solely by the appended claims.

What is claimed is:

1. A laser scanning control apparatus comprising:
    a light source driven in accordance with image data defined in pixels and adapted to emit a laser beam;
    a rotating polygon mirror for scanning the laser beam emitted from the light source in a main scanning direction of an image bearing member; and
    a correction portion for, every one or more correction points on a main scanning line of the image bearing member to be scanned with the laser beam, extending the pixel length for each pixel located in the correction point concerned to thereby correct the scanning magnification of the main scanning line, and for changing the rotational speed of the rotating polygon mirror to correct the magnification in a sub scanning direction to thereby correct the output magnification,
    wherein the correction portion adds, as a next bit data, a same bit data as a predetermined bit data of pixel-division-modulated pixel data of the pixel located at the correction point to thereby extend a pixel length for the pixel located at the correction point.

2. A laser scanning control apparatus according to claim 1, wherein the correction portion adjusts the magnifications in the main scanning and sub scanning directions so that these magnifications become predetermined image output magnifications.

3. A laser scanning control apparatus according to claim 1, wherein the correction portion, when images are outputted to both surfaces of a sheet material, changes the respective output image magnifications of a front surface and a back surface.

4. A laser scanning control apparatus according to claim 1, wherein the correction portion, when images are outputted to both surfaces of a sheet material, makes the image extension to the surface of the sheet material on which the image is to be firstly formed larger than that to the surface of the sheet material on which the image is to be next formed.

5. A laser scanning control apparatus according to claim 1, wherein the correction portion, when images are outputted to both surfaces of a sheet material, changes the output image magnifications of a front surface and a back surface of the sheet material in accordance with the kind of sheet material.

6. A laser scanning control apparatus according to claim 1, wherein the correction portion has a high-frequency clock generation portion for generating a high-frequency clock signal having a frequency which is an integral multiple of that of a basic clock signal from the basic clock signal, and each of the pixel lengths is composed of a plurality of high-frequency clock signals, and when the pixel length is extended, the number of constituent high-frequency clock signals is increased.

7. A laser scanning control apparatus comprising:
    a light source, which is driven in accordance with image data defined in pixels and adapted to emit a laser beam;
    a rotating polygon mirror, which scans the laser beam emitted from said light source in a main scanning direction of an image bearing member; and
    a correction portion, which in each of plural correction points on a main scanning line of the image bearing member to be scanned with the laser beam, extends a pixel length for each pixel located in the correction point concerned to thereby correct a scanning magnification of the main scanning line, and which changes a rotational speed of said rotating polygon mirror to correct a magnification in a sub scanning direction to thereby correct an output magnification,
    wherein said correction portion increases a number of high-frequency clock constituting an image clock signal of the pixel located in the correction point, and adds a same bit data as a predetermined bit data of bit data constituting the pixel to thereby extend the pixel length for the pixel located in the correction point.

8. A laser scanning control apparatus according to claim 7, wherein said correction portion, when images are outputted to both surfaces of a sheet material, makes a magnification correction of an image formed on a first side of the sheet material larger than a magnification correction of an image formed on a second side of the sheet material.

9. A laser scanning control apparatus according to claim 7, wherein said correction portion, when images are outputted to both surfaces of a sheet material, performs a magnification correction of an image formed on a first side of the sheet material, but does not perform a magnification correction of an image formed on a second side of the sheet material.

* * * * *

UNITED STATES PATENT AND TRADEMARK OFFICE
CERTIFICATE OF CORRECTION

| | | |
|---|---|---|
| PATENT NO. | : 7,139,013 B2 | Page 1 of 1 |
| APPLICATION NO. | : 11/125182 | |
| DATED | : November 21, 2006 | |
| INVENTOR(S) | : Takashi Kanno | |

It is certified that error appears in the above-identified patent and that said Letters Patent is hereby corrected as shown below:

ON THE TITLE PAGE:
  The following notice was omitted, and should be inserted:

[*]     Notice:      This patent is subject to a terminal disclaimer.

Signed and Sealed this

First Day of May, 2007

JON W. DUDAS
*Director of the United States Patent and Trademark Office*